(12) United States Patent
Railing

(10) Patent No.: US 12,358,021 B2
(45) Date of Patent: Jul. 15, 2025

(54) COOP CLEANING DEVICE

(71) Applicant: Kathy Lynn Railing, Vancouver, WA (US)

(72) Inventor: Kathy Lynn Railing, Vancouver, WA (US)

( * ) Notice: Subject to any disclaimer, the term of this patent is extended or adjusted under 35 U.S.C. 154(b) by 0 days.

(21) Appl. No.: 18/649,270

(22) Filed: Apr. 29, 2024

(65) Prior Publication Data

US 2024/0359214 A1 Oct. 31, 2024

Related U.S. Application Data

(60) Provisional application No. 63/462,758, filed on Apr. 28, 2023.

(51) Int. Cl.
*B07B 1/02* (2006.01)
*A01K 31/04* (2006.01)

(52) U.S. Cl.
CPC .............. *B07B 1/02* (2013.01); *A01K 31/04* (2013.01)

(58) Field of Classification Search
CPC .................................. A01K 31/04; B07B 1/02
USPC .................................. 209/417, 418, 419, 420
See application file for complete search history.

(56) References Cited

U.S. PATENT DOCUMENTS

| | | | | |
|---|---|---|---|---|
| 985,568 | A * | 2/1911 | Conover | A01D 11/04 209/419 |
| 5,921,596 | A * | 7/1999 | Sheriff | A01K 1/0114 209/418 |
| D416,359 | S | 11/1999 | Schlueter | |
| 6,062,618 | A | 5/2000 | Figueroa | |
| 6,092,668 | A | 7/2000 | Lewis | |
| 6,312,029 | B1 * | 11/2001 | Renforth | A01K 1/0114 294/1.3 |
| 7,044,520 | B2 * | 5/2006 | Roberson, Jr. | A01B 1/02 294/55.5 |
| 9,179,642 | B2 * | 11/2015 | Knittel | A01K 1/0114 |
| 2005/0218044 | A1 * | 10/2005 | Bramante | A01D 44/00 209/417 |
| 2006/0156991 | A1 | 7/2006 | Burns | |
| 2007/0267333 | A1 | 11/2007 | Delman | |
| 2012/0025549 | A1 | 2/2012 | Lipscomb | |
| 2013/0140220 | A1 * | 6/2013 | Knittel | A01K 1/01 209/419 |

* cited by examiner

*Primary Examiner* — Terrell H Matthews
(74) *Attorney, Agent, or Firm* — Brennan, Manna & Diamond, LLC

(57) ABSTRACT

A chicken coop cleaning device that is used to sift through sand, sawdust, or coffee grounds inside of a chicken coop to collect waste. The chicken coop cleaning device comprises a head component that is configured in a rectangular shape with a scoop component at one end to resemble a barn rake. A handle is then secured to the opposite end of the scoop component for use. Further, the head component would have a plurality of tines that run parallel and ¼" mesh wire running over the head component, covering the plurality of tines. The mesh wire allows the user to collect chicken waste, while the bedding material, such as sand, sawdust, or coffee grounds fall through the mesh wire and back into the chicken coop for reuse. Thus, the bedding material can be recycled for a longer period of time.

16 Claims, 3 Drawing Sheets

COOP CLEANING DEVICE

CROSS-REFERENCE TO RELATED APPLICATION

The present application claims priority to, and the benefit of, U.S. Provisional Application No. 63/462,758, which was filed on Apr. 28, 2023, and is incorporated herein by reference in its entirety.

FIELD OF THE INVENTION

The present invention relates generally to the field of chicken coop cleaning devices. More specifically, the present invention relates to an improved hand tool for cleaning out chicken coops to remove solid waste. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in chicken coop cleaning devices. Generally, removing chicken waste and bedding from a coop can take considerable time and effort. Furthermore, when using a shovel, fresh bedding is often removed and needs to be replaced, which can be expensive. Accordingly, farmers and ranchers may have little time for other tasks, if they need to clean out a chicken coop.

Another common tool used to clean a chicken coop is a rake. However, a rake only gathers objects that do not pass through its teeth, and even then the debris that is gathered has to be shoveled or picked up by hand, making the use of a rake unsatisfactory for cleaning out chicken coops. Further, most chicken waste can easily fall through the teeth, making raking even more unsatisfactory and causing users to rely on other tools or pick out the bedding by hand, which can be very labor intensive.

Accordingly, there is a demand for an improved chicken coop cleaning device that provides users with a hand tool for removing solid waste from a chicken coop. More particularly, there is a demand for a chicken coop cleaning device that removes chicken waste while bedding remains inside the enclosure for reuse.

Therefore, there exists a long-felt need in the art for a chicken coop cleaning device that provides users with an improved hand tool for cleaning out chicken coops to remove solid waste. There is also a long-felt need in the art for a chicken coop cleaning device that allows users to remove chicken waste while bedding remains inside the enclosure for reuse. Further, there is a long-felt need in the art for a chicken coop cleaning device that resembles a barn rake with mesh material applied to the tool head that collects waste while leaving behind clean bedding like sand, sawdust, or coffee grounds. Moreover, there is a long-felt need in the art for a device that saves considerable hours of work while creating a more sanitary living quarter for a flock of chickens. Further, there is a long-felt need in the art for a chicken coop cleaning device that allows bedding material to be recycled for a longer period of time. Finally, there is a long-felt need in the art for a chicken coop cleaning device that sifts through sand, sawdust, or coffee grounds inside of a chicken coop to collect waste.

The subject matter disclosed and claimed herein, in one embodiment thereof, comprises a chicken coop cleaning device. The device is a rake to be used to sift through sand, sawdust, or coffee grounds inside of a chicken coop to collect waste. The chicken coop cleaning device comprises a head component that is configured in a rectangular shape with a scoop component at one end to resemble a barn rake. A handle is then secured to the opposite end of the head component for use. Further, the head component would have a plurality of tines that run parallel and ¼" mesh wire running over the head component, covering the plurality of tines. The mesh wire allows the user to collect chicken waste, while the bedding material, such as sand, sawdust, or coffee grounds fall through the mesh wire and back into the chicken coop for reuse. Thus, the bedding material can be recycled for a longer period of time. Accordingly, the device is designed to save the flock owner many hours of work and make for more sanitary living quarters for the flock.

In this manner, the chicken coop cleaning device of the present invention accomplishes all of the foregoing objectives and provides users with a device that cleans out chicken coops without removing the bedding. The device is a barn rake with wire mesh secured over the tines. The device can be manufactured of a plastic or metal material.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a chicken coop cleaning device. The device is a rake to be used to sift through sand, sawdust, or coffee grounds inside of a chicken coop to collect waste. The chicken coop cleaning device comprises a head component that is configured in a rectangular shape with a scoop component at one end to resemble a barn rake. A handle is then secured to the opposite end of the head component for use. Further, the head component would have a plurality of tines that run parallel and ¼" mesh wire running over the head component, covering the plurality of tines. The mesh wire allows the user to collect chicken waste, while the bedding material, such as sand, sawdust, or coffee grounds fall through the mesh wire and back into the chicken coop for reuse. Thus, the bedding material can be recycled for a longer period of time. Accordingly, the device is designed to save the flock owner many hours of work and make for more sanitary living quarters for the flock.

In one embodiment, the chicken coop cleaning device of the present invention comprises a head component and a detachable handle for sliding the head component across a surface. The head component comprises a frame in a rectangular or square shape or any other suitable shape as is known in the art. The frame comprises a pair of opposing right and left sides, a bottom surface, a back side, and an open front side, which together create a top opening. Further, the open front side comprises a scoop component that is an inclined wall, which acts to scoop or shovel up chicken waste when in use. The head component can be any suitable shape and size as is known in the art. Further, the frame comprises a plurality of tines in a parallel configuration, which are positioned along a length of the frame and its sidewalls and surfaces. Additionally, the plurality of tines are covered by a mesh wire. The mesh wire can be secured to a plurality of tines via screws, clips, straps, or other suitable fasteners as is known in the art. The mesh wire can be any suitable mesh wire, such as, but not limited to, poultry netting or similar fencing material, formed from aluminum, stainless steel, or other appropriate metal, with spacing on the order of 10-15 mm (0.35 to 0.6 in.), but preferably ¼ inch mesh. In another embodiment, a sheet metal, such as aluminum sheet metal can be used, with a large number of bores therethrough, with the bores of sufficient size, i.e., 10-15 mm, to easily pass sand, sawdust, or coffee grounds, etc., while trapping items such as chicken waste. The edge of the mesh material is secured directly to the perimeter of the frame. Ideally, the mesh and plurality of tines will be formed from or coated with a self-lubricating material such as Teflon® or a similar polymer or plastic, or have a hard, smooth finish such as powder-coated metal, that will permit the head component to be drawn through the sand, sawdust, coffee grounds, chicken waste, etc., with minimal frictional resistance and without dirt or other material clinging to the surface.

In one embodiment, the handle is preferably constructed in multiple sections that can be broken down for easy transport. The sections may be telescoping so that the handle can be collapsed to a shorter length, or the handle may be constructed in separable sections. In the exemplary embodiment, the total handle length is on the order of 120 cm (~48 in.), which may be reduced to about 60 cm (~24 in.) when disassembled or collapsed. Specifically, the handle is telescoping, with the upper section fitting into the lower section. Means for attachment of the handle sections for assembly can be any fastener known in the art, including the preferred thumb screws, spring-biased pop-up buttons mating with a corresponding bore, bayonet mounts, or mating male and female threaded ends, etc. Accordingly, a spring-biased button extending from the surface of the upper section is depressed by the inner surface of the upper section when the handle is collapsed but pops out into one or more bores formed in the lower section, when the handle and bore are aligned to lock the handle in its extended position. To collapse the handle, the button is depressed and the upper section is guided into the lower section. Such fastening mechanisms are well-known in the art.

In one embodiment, the handle is an elongated cylindrical shaft with a first end and a second end. The second end is secured to the head component and may be secured via any suitable securing means as is known in the art, such as heat-staked, adhesives, pinned, couplings, screws, snap fit, etc. In one embodiment, the handle is mounted on the head component via releasably attaching means, such as a spring-biased button near the second end of the handle. In one embodiment, the handle and the head component may be formed as a single, solid plastic assembly.

In one embodiment, the handle can be any suitable shape and size as is known in the art. Further, the length and diameter of the handle may vary widely, as it is important only that it be reasonably comfortable to hold by hand and allow use, (i.e., scooping of chicken waste) with relative ease. Furthermore, the first end of the handle comprises a rectangular cross section with rounded corners, similar to a tennis racket handle, or any other suitable ergonomic grip, texture, coating, etc., as is known in the art, depending on the needs and/or wants of a user. Additionally, the handle can also be curved or rounded, or otherwise ergonomically shaped to allow the user to more easily scoop up waste and sift out the bedding material when in use.

In another embodiment, the first end of the handle may also be provided with an elongated through hole with a string or rope attached, to allow the device to be hung from a hook on a door or wall of a garage or barn.

To use the chicken coop cleaning device, after transport to the chicken coop, the user extends the handle to its full length by extending the telescoping sections and securing them in, at the desired length. If unattached, the handle is then secured to the head component via the securing means in use. For example, if the handle and head component have mating threads, the handle is screwed into the head component. If the handle has a spring-biased button, the handle end is inserted into the head component until the button is aligned with the designated opening in the head component.

The head component is then placed in the chicken coop. The device is then used to slide across the chicken coop floor and scoop up chicken waste and bedding material. The user then lifts up the head component via the handle and sifts the bedding material from the head component via the wire mesh. Typically, the device will be slid like a shovel and used to scoop up chicken waste and bedding material. Once the bedding materials are sifted out, the collected chicken waste is then disposed of in a garbage can, if available, or simply deposited at a collection point away from the area that is being cleaned. After use, the device can be disassembled and stored in its compact form in a garage, shed, or barn, or can be stored assembled and hung on the wall of a shed, barn, or garage via a through hole on the first end of the handle or a strap/rope secured through the handles through hole.

The device of the present invention may be used for a number of different applications involving the removal of objects from an area, such as a playground, beach, shoreline, yard, or other similar setting besides a chicken coop. Thus, the device provides a means for enhancing the safety of various locations and is configured for easy transport to such locations.

It is preferred that the chicken coop cleaning device be made of aluminum, but alternative materials such as plastics and alloys may also be used. For example, the device can be made of a lightweight, durable material and manufactured from heat-sealable plastic or polymers, such as polypropylene or acrylonitrile-butadiene-styrene (ABS), or any other suitable material as is known in the art, such as, but not limited to, acrylic, polycarbonate, polyethylene, polyethylene terephthalate, polyvinyl chloride, polystyrene, etc. Generally, the chicken coop cleaning device is also manufactured from a material that is water resistant or waterproof, or the head component and handle comprise a coating that is water resistant or waterproof. Further, the chicken coop cleaning device can be made of antibacterial or antimicrobial material or the head component and handle comprise a coating that is antibacterial or antimicrobial.

In yet another embodiment, the chicken coop cleaning device comprises a plurality of indicia.

In yet another embodiment, a method of cleaning a chicken coop is disclosed. The method includes the steps of providing a chicken coop cleaning device comprising a head component with a plurality of tines and wire mesh and a handle. The method also comprises securing the handle to the head component for use. Further, the method comprises raking the chicken waste via the chicken coop cleaning device. Finally, the method comprises sifting through the bedding material via the wire mesh, to sift out sand, sawdust, or coffee grounds for reuse.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
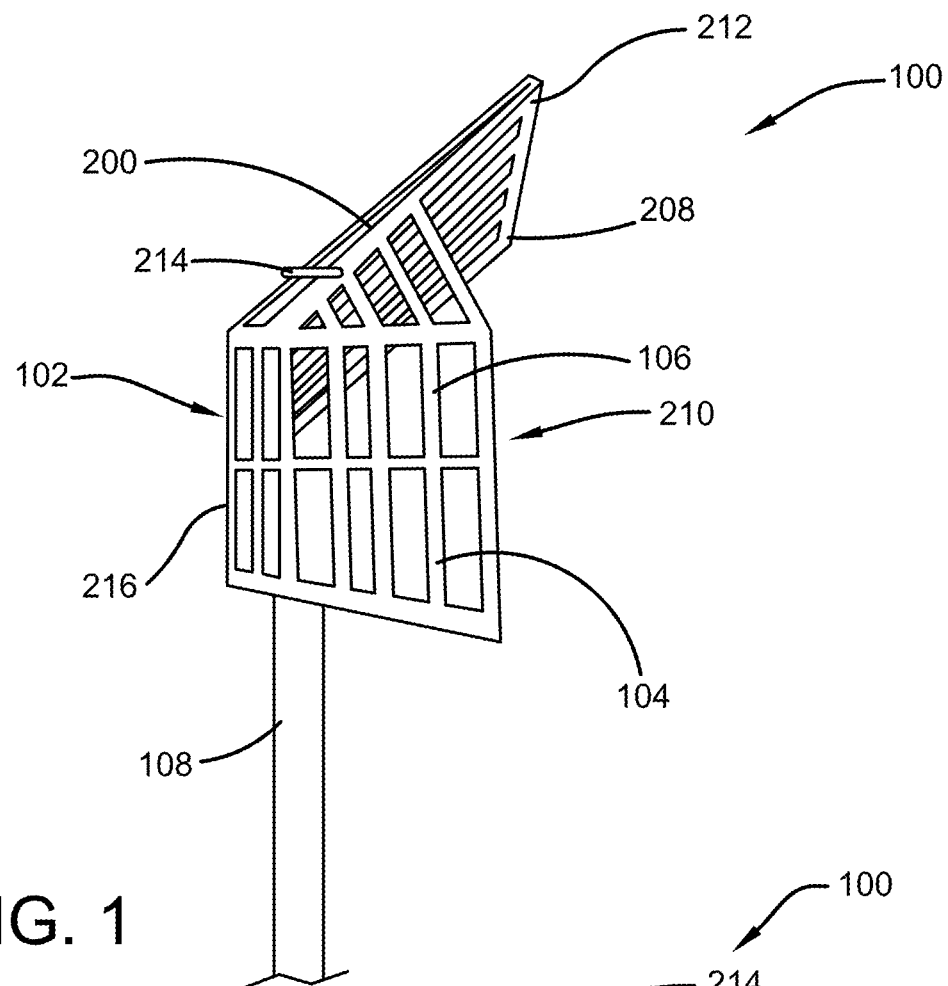
FIG. 1 illustrates a side perspective view of one embodiment of the chicken coop cleaning device of the present invention showing the head component of the device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a chicken coop cleaning device that provides users with an improved hand tool for cleaning out chicken coops to remove solid waste. There is also a long-felt need in the art for a chicken coop cleaning device that allows users to remove chicken waste while bedding remains inside the enclosure for reuse. Further, there is a long-felt need in the art for a chicken coop cleaning device that resembles a barn rake with mesh material applied to the tool head that collects waste while leaving behind clean bedding like sand, sawdust, or coffee grounds. Moreover, there is a long-felt need in the art for a device that saves considerable hours of work while creating a more sanitary living quarter for a flock of chickens. Further, there is a long-felt need in the art for a chicken coop cleaning device that allows bedding material to be recycled for a longer period of time. Finally, there is a long-felt need in the art for a chicken coop cleaning device that sifts through sand, sawdust, or coffee grounds inside of a chicken coop to collect waste.

The present invention, in one exemplary embodiment, is a novel chicken coop cleaning device. The device is a rake to be used to sift through sand, sawdust, or coffee grounds inside of a chicken coop to collect waste. The chicken coop cleaning device comprises a head component that is configured in a rectangular shape with a scoop component at one end to resemble a barn rake. A handle is then secured to the opposite end of the head component for use. Further, the head component would have a plurality of tines that run parallel and ¼" mesh wire running over the head component, covering the plurality of tines. The mesh wire allows the user to collect chicken waste, while the bedding material, such as sand, sawdust, or coffee grounds fall through the mesh wire and back into the chicken coop for reuse. The present invention also includes a novel method of cleaning a chicken coop. The method includes the steps of providing a chicken coop cleaning device comprising a head component with a plurality of tines and wire mesh and a handle. The method also comprises securing the handle to the head component for use. Further, the method comprises raking the chicken waste via the chicken coop cleaning device. Finally, the method comprises sifting through the bedding material via the wire mesh, to sift out sand, sawdust, or coffee grounds for reuse.

Referring initially to the drawings, FIG. 1 illustrates a perspective view of one embodiment of the chicken coop cleaning device 100 of the present invention. In the present embodiment, the chicken coop cleaning device 100 is an improved chicken coop cleaning device 100 that provides a user 110 with a hand tool for cleaning out chicken coops 116 to remove solid waste 112. Specifically, the device 100 is a rake to be used to sift through sand, sawdust, or coffee grounds (i.e., bedding material 114) inside of a chicken coop 116 to collect waste 112. The chicken coop cleaning device 100 comprises a head component 102 with a plurality of tines 104 covered by mesh wire 106 and a handle 108. A handle 108 is then secured to the opposite end of the head component 102 for use. The mesh wire 106 allows the user 110 to collect chicken waste 112, while the bedding material 114, such as sand, sawdust, or coffee grounds fall through the mesh wire 106 and back into the chicken coop 116 for reuse. Thus, the bedding material 114 can be recycled for a longer period of time. Accordingly, the device 100 is designed to save the flock owner many hours of work and make for more sanitary living quarters for the flock.

Figure 2:
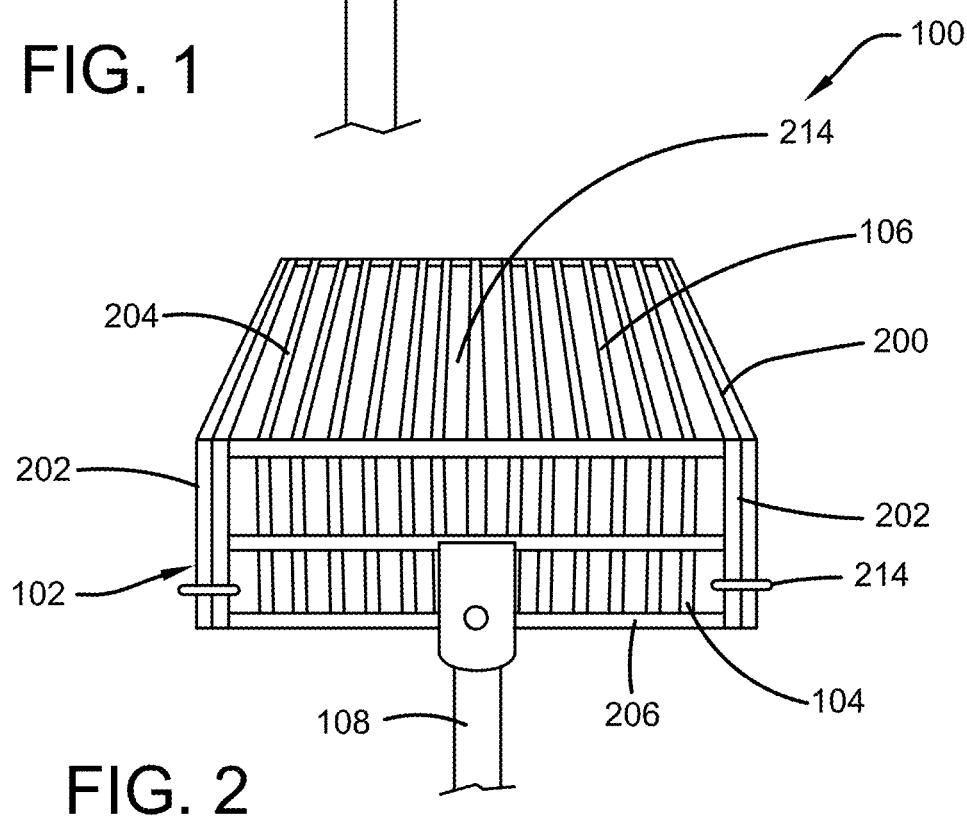
FIG. 2 illustrates a perspective view of one embodiment of the chicken coop cleaning device of the present invention showing the wire mesh of the device, applied to the tines in accordance with the disclosed architecture.

As shown in FIG. 2, the chicken coop cleaning device 100 of the present invention comprises a head component 102 and a detachable handle 108 for sliding the head component 102 across a surface. The head component 102 comprises a frame 200 in a rectangular or square shape or any other suitable shape as is known in the art. The frame 200 comprises a pair of opposing right and left sides 202, a bottom surface 204, a back side 206, and an open front side 208, which together create a top opening 210. Further, the open front side 208 comprises a scoop component 212 that is an inclined wall or angled front, which acts to scoop or shovel up chicken waste 112 when in use. The head component 102 can be any suitable shape and size as is known in the art.

Furthermore, the frame 200 comprises a plurality of tines 104 in a parallel configuration, which are positioned along a length of the frame 200 and its sidewalls 202, 206, and surfaces 204. The plurality of tines 104 can be cylindrical in shape, but can also be any suitable shape as is known in the art. The tines 104 can be any suitable length and width, as long as the tines 104 act to span the frame 200 and its sidewalls 202, 206, and surfaces 204 and are positioned in a spaced apart, parallel configuration, allowing space between the tines 104.

Additionally, the plurality of tines 104 are covered by a mesh wire 106. The mesh wire 106 can be secured to the plurality of tines 104 via screws, clips 214, straps, or other suitable fasteners as is known in the art. The mesh wire 106 can be any suitable mesh wire, such as, but not limited to, poultry netting or similar fencing material, formed from aluminum, stainless steel, or other appropriate metal, with spacing on the order of 10-15 mm (0.35 to 0.6 in.), but preferably ¼ inch mesh. In another embodiment, a sheet metal, such as aluminum sheet metal can be used, with a large number of bores therethrough, with the bores of sufficient size, i.e., 10-15 mm, to easily pass sand, sawdust, or coffee grounds, etc., while trapping items such as chicken waste 112. The edge of the mesh material 106 is secured directly to the perimeter of the frame 200. Ideally, the mesh 106 and plurality of tines 104 will be formed from or coated with a self-lubricating material 216 such as Teflon® or a similar polymer or plastic, or have a hard, smooth finish such as powder-coated metal, that will permit the head component 102 to be drawn through the sand, sawdust, coffee grounds 114, chicken waste 112, etc., with minimal frictional resistance and without dirt or other material clinging to the surface.

Figure 3:
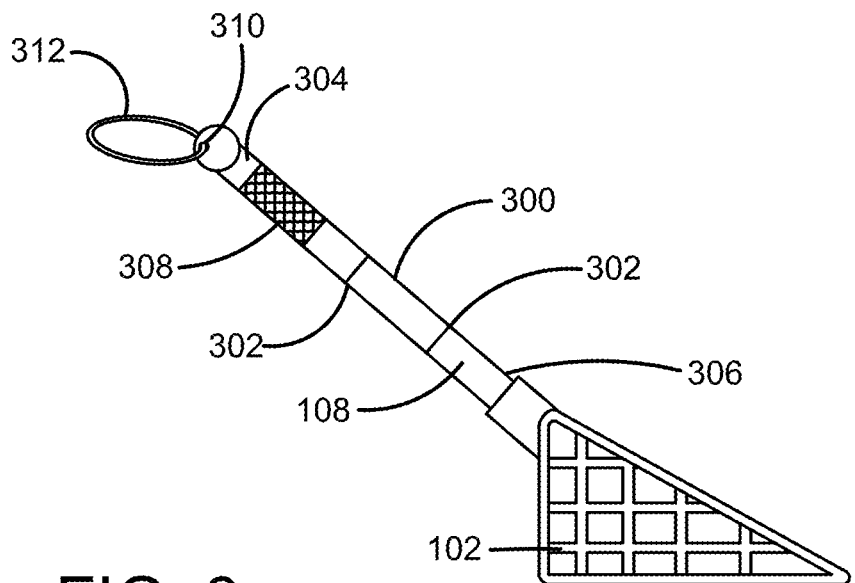
FIG. 3 illustrates a perspective view of one embodiment of the chicken coop cleaning device of the present invention showing the handle of the device in accordance with the disclosed architecture.

As shown in FIG. 3, the handle 108 is preferably constructed in multiple sections 300 that can be broken down for easy transport. The sections 300 may be telescoping so that the handle 108 can be collapsed to a shorter length, or the handle 108 may be constructed in separable sections 300. In the exemplary embodiment, the total handle 108 length is approximately 120 cm (~48 in.), which may be reduced to about 60 cm (~24 in.) when disassembled or collapsed. Specifically, the handle 108 is telescoping, with the upper section fitting into the lower section. Means for attachment of the handle sections 300 for assembly can be any fastener 302 known in the art, including the preferred thumb screws, spring-biased pop-up buttons mating with a corresponding bore, bayonet mounts, or mating male and female threaded ends, etc. Accordingly, a spring-biased button (i.e., fastener 302) extending from the surface of the upper section is depressed by the inner surface of the upper section when the handle 108 is collapsed but pops out into one or more bores formed in the lower section, when the handle 108 and bore are aligned to lock the handle 108 in its extended position. To collapse the handle 108, the button is depressed and the upper section is guided into the lower section. Such fastening mechanisms are well-known in the art.

Generally, the handle 108 is an elongated cylindrical shaft with a first end 304 and a second end 306. The second end 306 is secured to the head component 102 and may be secured via any suitable securing means as is known in the art, such as heat-staked, adhesives, pinned, couplings, screws, snap fit, etc. In one embodiment, the handle 108 is mounted on the head component 102 via releasably attaching means, such as a spring-biased button near the second end 306 of the handle 108. In one embodiment, the handle 108 and the head component 102 may be formed as a single, solid plastic assembly.

Further, the handle 108 can be any suitable shape and size as is known in the art. Further, the length and diameter of the handle 108 may vary widely, as it is important only that it be reasonably comfortable to hold by hand and allow use, (i.e., scooping of chicken waste 112) with relative ease. Furthermore, the first end 304 of the handle 108 comprises a rectangular cross section 308 with rounded corners, similar to a tennis racket handle, or any other suitable ergonomic grip, texture, or coating, etc., as is known in the art, depending on the needs and/or wants of a user 110. Additionally, the handle 108 can also be curved, rounded, or otherwise ergonomically shaped to allow the user 110 to more easily scoop up waste 112 and sift out the bedding material 114 when in use.

In one embodiment, the first end 304 of the handle 108 may also be provided with an elongated through hole 310 with a string or rope 312 attached, to allow the device 100 to be hung from a hook on a door or wall of a garage or barn.

Figure 4:
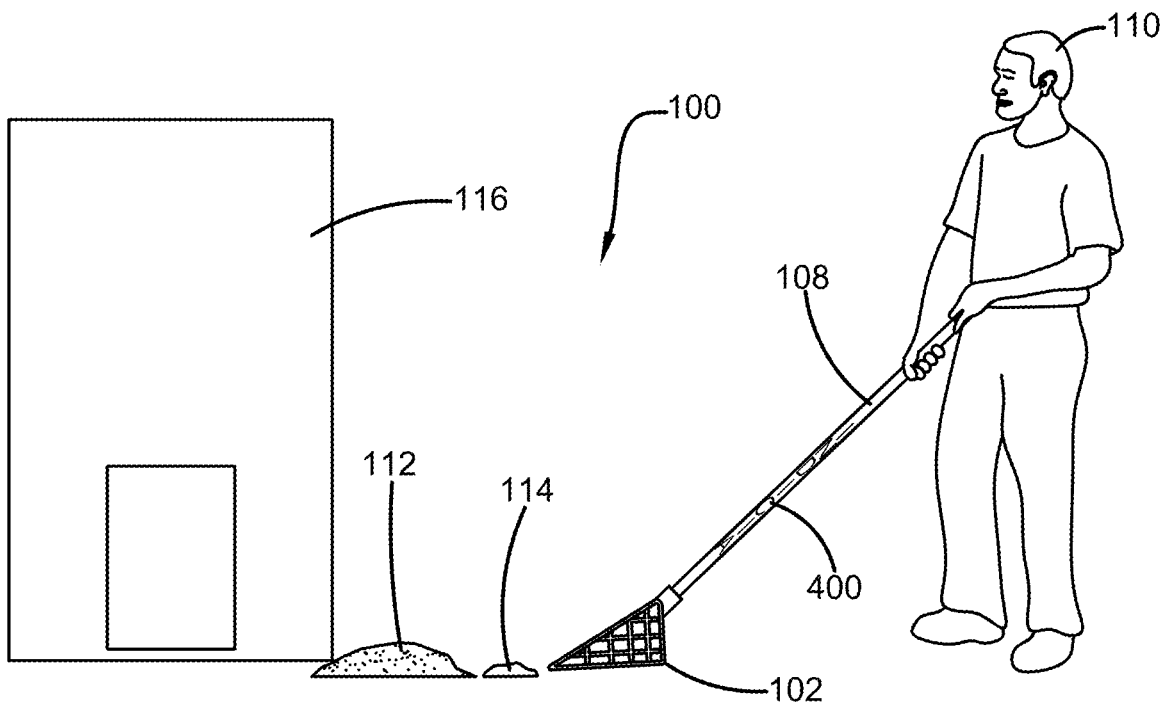
FIG. 4 illustrates a perspective view of one embodiment of the chicken coop cleaning device of the present invention showing the device in use in accordance with the disclosed architecture.

As shown in FIG. 4, to use the chicken coop cleaning device 100, after transport to the chicken coop 116, the user 110 extends the handle 108 to its full length by extending the telescoping sections 300 and securing them in, at the desired length. If unattached, the handle 108 is then secured to the head component 102 via the securing means in use. For example, if the handle 108 and head component 102 have mating threads, the handle 108 is screwed into the head component 102. If the handle 108 has a spring-biased button, the handle end is inserted into the head component 102 until the button is aligned with the designated opening in the head component 102.

The head component 102 is then placed in the chicken coop 116. The device 100 is then used to slide across the chicken coop floor and scoop up chicken waste 112 and bedding material 114. The user 110 then lifts up the head component 102 via the handle 108 and sifts the bedding material 114 from the head component 102 via the wire mesh 106. Typically, the device 100 will be slid like a shovel and used to scoop up chicken waste 112 and bedding material 114. Once the bedding materials 114 are sifted out, the collected chicken waste 112 is then disposed of in a garbage can, if available, or simply deposited at a collection point away from the area that is being cleaned. After use, the device 100 can be disassembled and stored in its compact form in a garage, shed, or barn, or can be stored assembled and hung on the wall of a shed, barn, or garage via a through hole 310 on the first end 304 of the handle 108 or a strap/rope 312 secured through the handles through hole 310.

The device 100 of the present invention may be used for a number of different applications involving the removal of objects from an area, such as a playground, beach, shoreline, yard, or other similar setting besides a chicken coop 116. Thus, the device 100 provides a means for enhancing the safety of various locations and is configured for easy transport to such locations.

It is preferred that the chicken coop cleaning device 100 be made of aluminum, but alternative materials such as plastics and alloys may also be used. For example, the device 100 can be made of a lightweight, durable material and manufactured from heat-sealable plastic or polymers, such as polypropylene or acrylonitrile-butadiene-styrene (ABS), or any other suitable material as is known in the art, such as, but not limited to, acrylic, polycarbonate, polyethylene, polyethylene terephthalate, polyvinyl chloride, polystyrene, etc. Generally, the chicken coop cleaning device 100 is also manufactured from a material that is water resistant or waterproof, or the head component 102 and handle 108 comprise a coating that is water resistant or waterproof. Further, the chicken coop cleaning device 100 can be made of antibacterial or antimicrobial material, or the head component 102 and handle 108 comprise a coating that is antibacterial or antimicrobial.

In yet another embodiment, the chicken coop cleaning device 100 comprises a plurality of indicia 400. The head component 102 and handle 108 of the device 100 may include advertising, a trademark, or other letters, designs, or characters, printed, painted, stamped, or integrated into the head component 102 or handle 108, or any other indicia 400 as is known in the art. Specifically, any suitable indicia 400 as is known in the art can be included, such as, but not limited to, patterns, logos, emblems, images, symbols, designs, letters, words, characters, animals, advertisements, brands, etc., that may or may not be chicken coop, chicken, or brand related.

Figure 5:
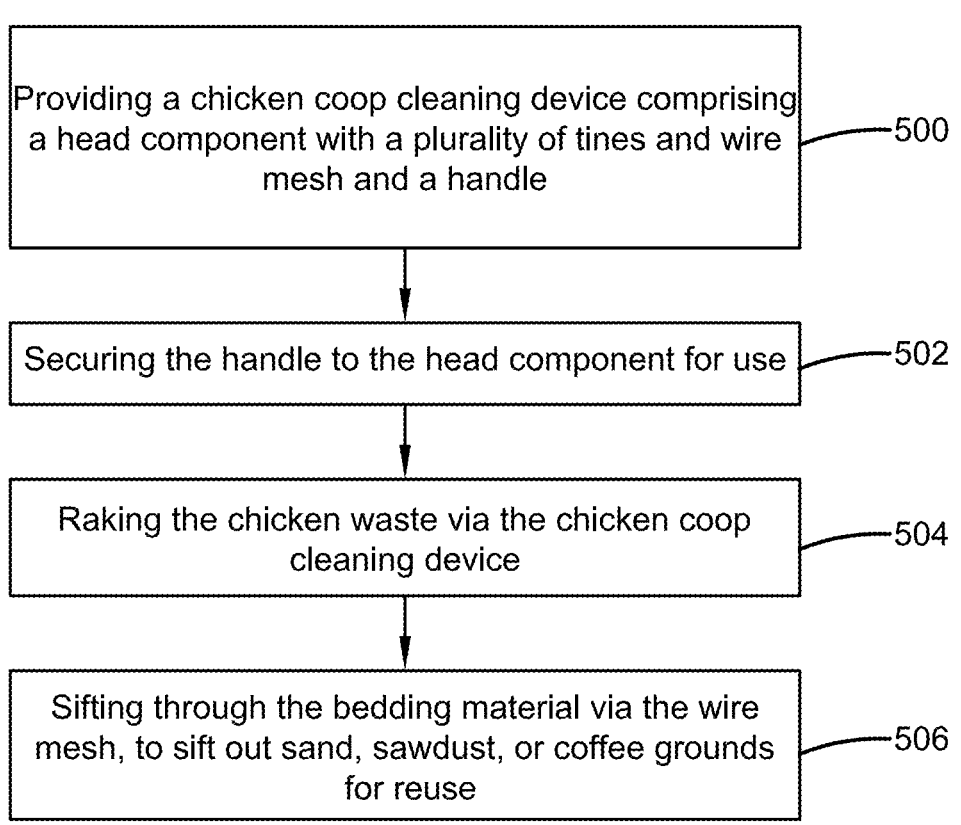
FIG. 5 illustrates a flowchart showing the method of cleaning a chicken coop in accordance with the disclosed architecture.

FIG. 5 illustrates a flowchart of the method of cleaning a chicken coop. The method includes the steps of at 500, providing a chicken coop cleaning device comprising a head component with a plurality of tines and wire mesh, and a handle. The method also comprises at 502, securing the handle to the head component for use. Further, the method comprises at 504, raking the chicken waste via the chicken coop cleaning device. Finally, the method comprises at 506, sifting through the bedding material via the wire mesh, to sift out sand, sawdust, or coffee grounds for reuse.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "chicken coop cleaning device", "chicken coop device", "cleaning device", and "device" are interchangeable and refer to the chicken coop cleaning device 100 of the present invention.

Notwithstanding the foregoing, the chicken coop cleaning device 100 of the present invention can be of any suitable size and configuration as is known in the art without affecting the overall concept of the invention, provided that it accomplishes the above-stated objectives. One of ordinary skill in the art will appreciate that the chicken coop cleaning device 100 as shown in FIGS. 1-5 is for illustrative purposes only, and that many other sizes and shapes of the chicken coop cleaning device 100 are well within the scope of the present disclosure. Although the dimensions of the chicken coop cleaning device 100 are important design parameters for user convenience, the chicken coop cleaning device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A chicken coop cleaning device that provides a user with a hand tool for cleaning out chicken coops, the chicken coop cleaning device comprising:
   a head component;
   a handle;
   a mesh wire; and
   a plurality of clips; and
   wherein the handle is secured to the head component;
   wherein the head component comprises a plurality of self-lubricating coated tines;
   wherein the mesh wire is attached to the self-lubricating coated tines via the plurality of clips;
   wherein a user uses the head component to collect chicken waste from a chicken coop, while bedding material is sifted out through the mesh wire; and
   wherein the handle is an antibacterial coated handle.

2. The chicken coop cleaning device of claim 1, wherein the bedding material comprises sand, sawdust, or coffee grounds.

3. The chicken coop cleaning device of claim 2, wherein the head component comprises a frame in a rectangular or square shape.

4. The chicken coop cleaning device of claim 3, wherein the frame comprises a pair of opposing right and left sides, a bottom surface, a back side, and an open front side, which together create a top opening.

5. The chicken coop cleaning device of claim 4, wherein the open front side comprises a scoop component that is an angled front, which acts to scoop or shovel up the chicken waste.

6. The chicken coop cleaning device of claim 5, wherein the frame comprises the plurality of tines in a spaced apart, parallel configuration, which are positioned along a length of the frame and its sidewalls and surfaces.

7. The chicken coop cleaning device of claim 6, wherein the mesh wire has a plurality of ¼" holes.

8. The chicken coop cleaning device of claim 7, wherein the handle is constructed in multiple telescoping sections that can be broken down for easy transport.

9. The chicken coop cleaning device of claim 8, wherein the multiple telescoping sections are secured together via fasteners.

10. The chicken coop cleaning device of claim 9, wherein the handle is an elongated cylindrical shaft with a first end and a second end, with the second end releasably secured to the head component.

11. The chicken coop cleaning device of claim 10, wherein the handle and the head component are formed as a single, solid plastic assembly.

12. A chicken coop cleaning device that provides a user with a hand tool for cleaning out chicken coops, the chicken coop cleaning device comprising:
   a head component comprising a frame in a rectangular or square shape;
   a mesh wire;
   a plurality of clips; and a handle that is an elongated cylindrical shaft with a first end and a second end, with the second end releasably secured to the head component;

wherein the frame comprises a pair of opposing right and left sides, a bottom surface, a back side, and an open front side, which together create a top opening;

wherein the open front side comprises a scoop component that is an angled front, which acts to scoop or shovel up the chicken waste;

wherein the frame comprises a plurality of tines in a spaced apart, parallel configuration, which are positioned along a length of the frame and its sidewalls and surfaces;

wherein the mesh wire is secured to the plurality of tines via the plurality of clips;

wherein the handle comprises a rectangular cross section with rounded corners for grip at the first end and a hanging component;

wherein a user uses the head component to collect chicken waste from a chicken coop, while bedding material is sifted out through the mesh wire; and wherein the handle is an antimicrobial coated handle.

13. The chicken coop cleaning device of claim 12 further comprising a plurality of indicia.

14. The chicken coop cleaning device of claim 12, wherein the handle is constructed in multiple telescoping sections that can be broken down for easy transport and are secured together via fasteners.

15. The chicken coop cleaning device of claim 12, wherein the handle and the head component are formed as a single, solid plastic assembly.

16. A method of cleaning a chicken coop, the method comprising the following steps:

providing a chicken coop cleaning device comprising a curved antibacterial coated handle, a head component comprising a plurality of self-lubricating coated tines, a wire mesh, and a plurality of clips attaching the wire mesh to the self-lubricating coated tines;

securing the curved antibacterial coated handle to the head component for use;

raking the chicken waste via the chicken coop cleaning device; and sifting through the bedding material via the wire mesh, to sift out sand, sawdust, or coffee grounds for reuse.

\* \* \* \* \*